(12) United States Patent
Matsuura (10) Patent No.: US 7,581,524 B2
(45) Date of Patent: Sep. 1, 2009

(54) ENGINE FRONT STRUCTURE (75) Inventor: Hirokazu Matsuura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 278 days.

(21) Appl. No.: 11/771,042

(22) Filed: Jun. 29, 2007

(65) Prior Publication Data

US 2008/0105227 A1 May 8, 2008

(30) Foreign Application Priority Data

Jun. 30, 2006 (JP) .............................. 2006-180779

(51) Int. Cl.
*F01L 1/00* (2006.01)
*F02F 7/00* (2006.01)
*F02B 67/00* (2006.01)

(52) U.S. Cl. .............................. 123/195 A; 123/195 C; 180/312

(58) Field of Classification Search ............. 123/195 C, 123/195 A, 90.15; 180/291, 312
See application file for complete search history.

(56) References Cited

U.S. PATENT DOCUMENTS 5,245,961 A 9/1993 Miyakubo et al.
5,743,229 A 4/1998 Hosoya

FOREIGN PATENT DOCUMENTS

JP 2003-083163 3/2003
KR 2003072020 A * 9/2003

* cited by examiner

*Primary Examiner*—Noah Kamen
(74) *Attorney, Agent, or Firm*—Brooks Kushman P.C.

(57) ABSTRACT

An engine front structure, which is provided with a cover body (9a) of the timing cover (9) which covers the camshaft driving force transmission mechanism at a position opposed to a front surface of the cylinder head. An upper extension portion (9b) of the timing cover (9) extends upwardly from an upper portion of the cover body (9a) and has an inner surface formed with a depression (12, 13) receiving therein the variable camshaft timing mechanism (7, 8). A fastening seat (14) on the cover body (9a) with a relatively high stiffness is located beneath of the upper extension portion (9b) and centrally in a width direction of the engine and is fastened to the engine body. An engine-mounting-bracket receiving seat (16) is formed on a top surface of the upper extension portion (9b) to have a relatively high stiffness and attached to an engine mounting bracket. A connection portion (17) is provided on a central region of the inner surface of the upper extension portion (9b) in the width direction of the engine to extend along the depression (12, 13) and connect between the fastening seat (14) and the engine-mounting-bracket receiving seat (16) with a relatively high stiffness.

9 Claims, 12 Drawing Sheets

ENGINE FRONT STRUCTURE

CROSS-REFERENCE TO RELATED APPLICATIONS

This application claims foreign priority benefits under 35 U.S.C. § 119(a)-(d) to JP 2006-180779, filed Jun. 30, 2006, which is hereby incorporated by reference in its entirety.

BACKGROUND OF THE INVENTION

1. Field of the Invention

The present invention relates to an engine front structure, and more particularly to an engine front structure equipped with a variable camshaft timing mechanism at a front end of a camshaft of the engine, which is designed to reduce an engine overall length while providing enhanced mounting and supporting stiffness.

2. Description of the Related Art

In an engine for a vehicle, such as a transverse engine designed to be mounted on a vehicle body in such a manner that a crankshaft of said engine is oriented in a width direction (i.e., lateral direction) of the vehicle body, one of the key challenges is how to reduce an outside dimension of the engine in an axial direction of the crankshaft, i.e., an overall engine length. Further, in a design process aiming to reduce the overall engine length, a key task is focused on a fixing structure of an engine mounting bracket for mounting and supporting an engine (including a powertrain unit which is an integrally assembled engine with a transmission unit) relative to a vehicle body, particularly a fixing structure of a mounting bracket for mounting and supporting a front of an engine body relative to a vehicle body. In particular, in an engine equipped with a variable camshaft timing mechanism (also known as "variable cam phase mechanism"), especially a solenoid-controlled type variable camshaft timing mechanism, at a front end of a camshaft of the engine to controllably change a rotational phase of the camshaft so as to change valve timings, the variable camshaft timing mechanism becomes a negative factor causing an increase in overall engine length. Thus, it becomes critical to achieve a shorter overall engine length based on an improvement of an engine front structure including an engine mounting bracket fixing structure.

For example, as a technique of mounting an engine in an engine compartment of a vehicle in a transverse arrangement where a crankshaft of said engine is oriented in a lateral direction of a vehicle body, there has been known a structure for mounting and supporting a front end of an engine body, or one of transverse ends with respect to vehicle, where a camshaft driving force transmission mechanism is arranged, wherein a timing cover fixed to a cylinder head and a cylinder block with a bolt to cover a camshaft driving force transmission mechanism is partially formed with a cutout, and an engine mounting bracket is placed in the cutout and fixed to the cylinder head with a bolt, so that the engine mounting bracket serves additionally as a part of the timing cover in order to facilitate a reduction in overall engine length (see, for example, U.S. Pat. No. 5,743,229).

As a technique for a V-type engine, there has been a structure which comprises a chain case (timing cover) divided into a front chain case and a rear chain case, and an engine mounting bracket divided into a lower bracket and an upper bracket which are integrally connected together with a bolt, and assembled to the chain case. Specifically, the lower bracket is formed to extend vertically along a central region of a front surface of the chain case, and an upper bracket has a front end formed as an engine-mount receiving portion attached to an engine mount, and a rearward extension portion extending toward a rear end of the engine to protrude from an upper end of the chain case. The lower bracket is fixed to a cylinder block with a bolt penetrating the front chain case, and the rearward extension portion of the upper bracket is connected to the rear chain case, so as to suppress vibration in a portion of the chain case between banks of the engine. (See, for example, JP 2003-83163A)

As to a structure for mounting and supporting a front end of an engine body in a transverse engine, the above techniques have heretofore been known. Among them, the technique of arranging an engine mounting bracket in a cutout partially formed in a timing cover involves a problem about structural complexity, such as a complicated configuration required for allowing the engine mounting bracket to be used as a part of the timing cover and fixed to an engine body. Moreover, it is not easy to firmly fix the engine mounting bracket onto a front end surface of the engine body which can afford only an extremely limited space therefor due to a camshaft driving force transmission mechanism complicatedly arranged thereover.

In the technique of dividing an engine mounting bracket into a lower bracket fixed onto a front surface of a timing cover and a lower bracket having a front end formed as an engine-mount receiving portion and a rearward extension portion extending toward a rear end of an engine to protrude from an upper end of the timing cover, and integrally connecting the lower and upper brackets together with a bolt, a primary purpose thereof is to suppress vibration in the timing cover, and the lower bracket disposed on the side of the front surface of the timing cover will hinder desirable reduction in overall engine length.

SUMMARY OF THE INVENTION

In view of the above problems, it is an object of the present invention to provide an engine front structure equipped with a variable camshaft timing mechanism at a front end of a camshaft of the engine, which is capable of reducing an overall engine length while providing enhanced mounting and supporting stiffness.

In order to achieve this object, the present invention provides an engine front structure in which an engine includes an engine body having a cylinder block and a cylinder head disposed at a top of the cylinder block; intake and exhaust camshafts which are disposed in an upper portion of the cylinder head and in parallel relation to each other; and a variable camshaft timing mechanism provided at one end of at least the intake camshaft in the camshafts to controllably change a rotational phase of corresponding camshaft. The variable camshaft timing mechanism is located on the side of a front of the engine where a camshaft driving force transmission mechanism is arranged. The engine is also provided with a timing cover. The engine front structure is provided with: a cover body of the timing cover which covers the camshaft driving force transmission mechanism at a position opposed to a front surface of the cylinder head; an upper extension portion of the timing cover which extends upwardly from an upper portion of the cover body and has an inner surface formed with a depression receiving therein the variable camshaft timing mechanism; a fastening seat on the cover body with a relatively high stiffness which is located beneath of the upper extension portion and centrally in a width direction of the engine and is fastened to the engine body; an engine-mounting-bracket, receiving seat which is formed on a top surface of the upper extension portion to have a relatively high stiffness and attached to an engine mounting bracket; and a connection portion which is provided on a central region of the inner surface of the upper extension portion in the width direction of the engine to extend along the depression and connect between the fastening seat and the engine-mounting-bracket receiving seat with a relatively high stiffness.

In the engine front structure of the present invention, the variable camshaft timing mechanism can be received in the depression formed in the inner surface of the upper extension portion of the timing cover, without hindering desirable reduction in overall engine length. In addition, the engine mounting bracket can be formed to extend above the timing cover so as to be fixed to the engine-mounting-bracket receiving seat formed on the top surface of the upper extension portion of the timing cover. Thus, a front end of the engine body can be supported from above without using an engine-mounting-bracket support portion hindering desirable reduction in overall engine length, for example, to be provided on a front surface of the timing cover. Further, in addition to a high stiffness of the engine-mounting-bracket receiving seat itself, the upper extension portion of the timing cover has the high-stiffness connection portion formed on a central region of the inner surface of the upper extension portion in the width direction of the engine to extend along the depression receiving therein the variable camshaft timing mechanism and connect between the high-stiffness fastening seat and the engine-mounting-bracket receiving seat. This makes it possible to ensure a high mounting and supporting stiffness, and facilitate a reduction in overall engine length while providing enhanced mounting and supporting stiffness.

These and other objects, features and advantages of the invention will become more apparent upon reading the following detailed description along with the accompanying drawings.

DESCRIPTION OF THE PREFERRED EMBODIMENTS OF THE INVENTION

FIGS. 1 to 12 show an engine front structure, according to an embodiment of the present invention. In this embodiment, the engine is an inline four-cylinder transverse engine designed to be mounted on a vehicle body in such a manner that a crankshaft 3a thereof is oriented in a width direction (i.e., lateral direction) of the vehicle body. Specifically, the engine is mounted in an engine compartment of a front of the vehicle body in a three-point mounting manner in such a way that a front end thereof is supported relative to a front frame 1 of the vehicle body by an engine mount 2 and a rear end thereof is supported by two mount portions (not shown) arranged in a longitudinal direction of the vehicle body.

Figure 1:
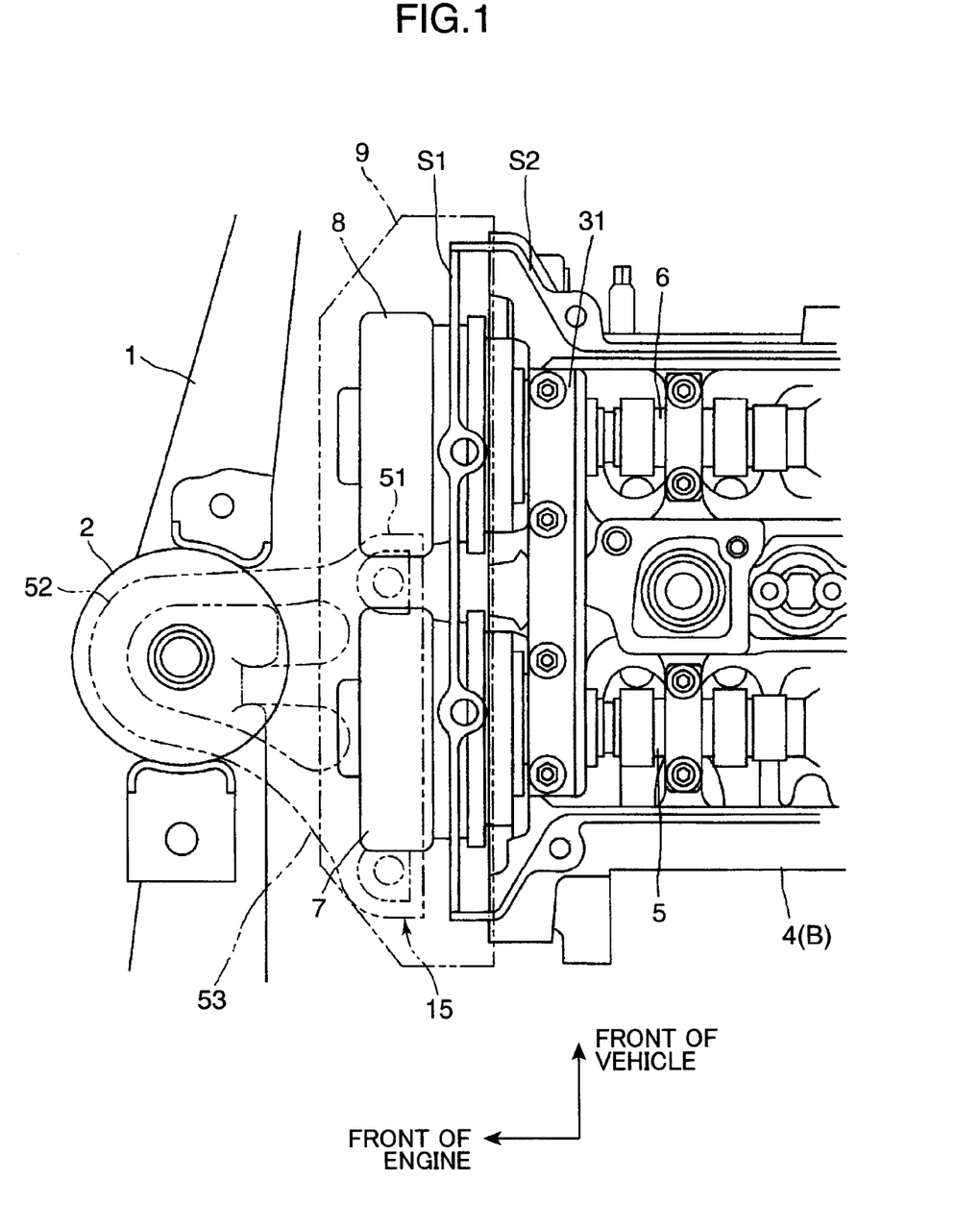
FIG. 1 is a top plan view showing an engine front structure, according to an embodiment of the present invention, in a state after a front of the engine is mounted and supported relative to a vehicle body, wherein a cylinder head cover is detached from the engine.
Figure 2:
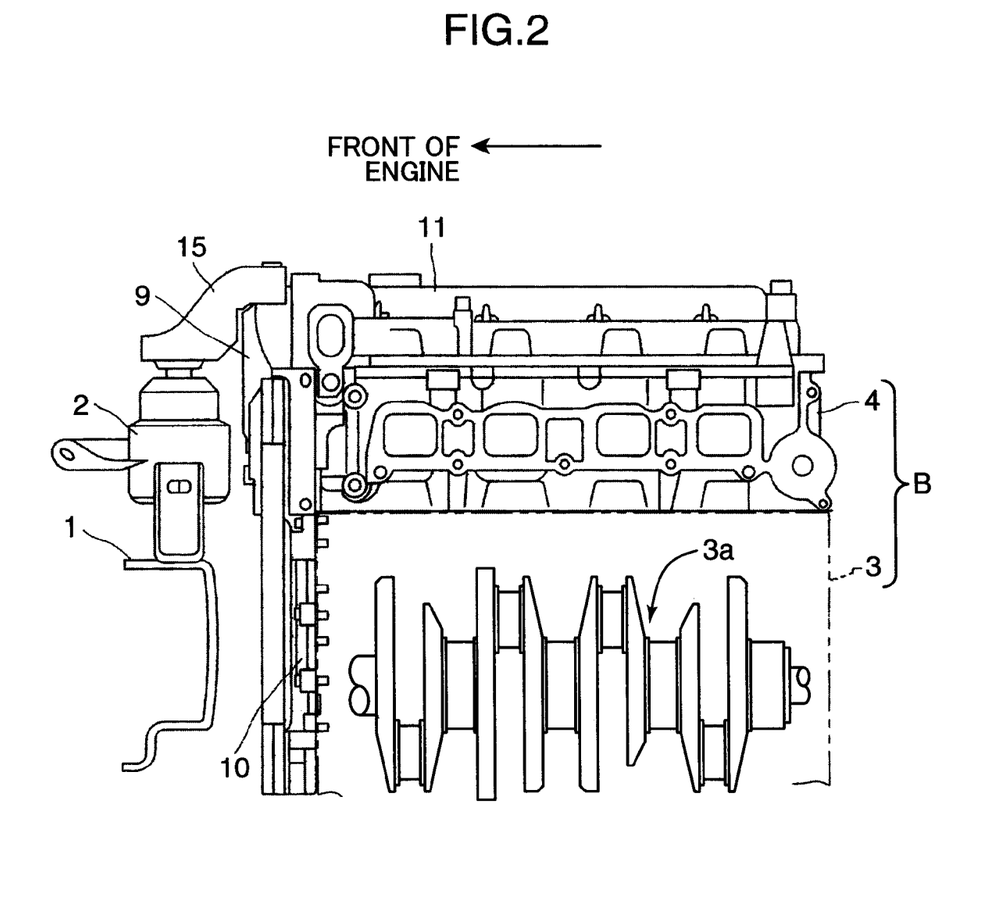
FIG. 2 is a side view showing the engine front structure according to the embodiment of the present invention, in the state after the front of the engine is mounted and supported relative to the vehicle body.

Referring to FIG. 2, the engine is provided with an engine body B which has a cylinder block 3 and a cylinder head 4 disposed at a top of the cylinder block 3. An intake camshaft 5 and an exhaust camshaft 6 (see FIG. 1) are disposed in an upper portion of the cylinder head 4 and in parallel relation to each other.

In a front of the engine, a camshaft driving force transmission mechanism (not shown) is arranged on the side of a front surface of the engine body B (corresponding to one longitudinal end of the crankshaft 3a) to transmit a driving force from the crankshaft 3a to each of the camshafts 5 and 6.

Two solenoid-controlled type variable camshaft timing mechanisms 7 and 8 each incorporating a solenoid actuator are disposed at and associated with respective front ends of the intake and exhaust camshafts 5 and 6. Each of the variable camshaft timing mechanisms 7 and 8 has a conventional structure as disclosed in, for example, U.S. Patent Application Publication No. 20050132988.

On the side of the front surface of the engine body B, a timing cover 9 is disposed in opposed relation to a front surface of the cylinder head 4 to cover the camshaft driving force transmission mechanism, and a casing cover 10 is disposed in opposed relation to a front surface of the cylinder block 3. The timing cover 9 and the casing cover 10 are fastened to the engine body B with a bolt so as to be assembled together. It is understood that these covers 9 and 10 may be integrally formed as a single component.

Figure 3:
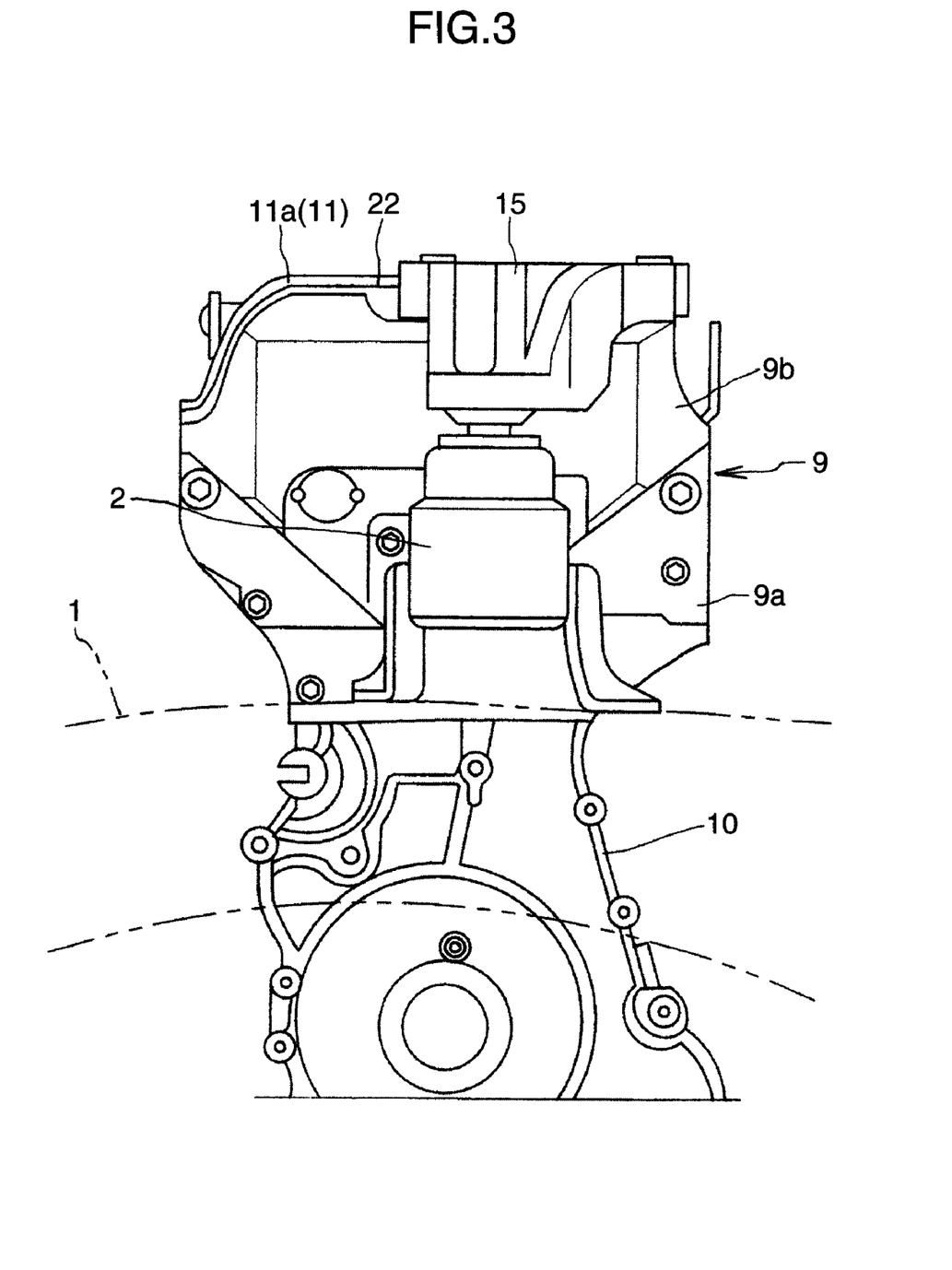
FIG. 3 is a front view showing the engine front structure according to the embodiment of the present invention, in the state after the front of the engine is mounted and supported relative to the vehicle body.

Referring to FIG. 3, the timing cover 9 has a cover body 9a which is opposed to the front surface of the cylinder head 4, and an upper extension portion 9b which extends upwardly from an upper portion of the cover body 9a and reaches a height position along a front edge of a cylinder head cover 11 disposed above the cylinder head 4.

Figure 4:
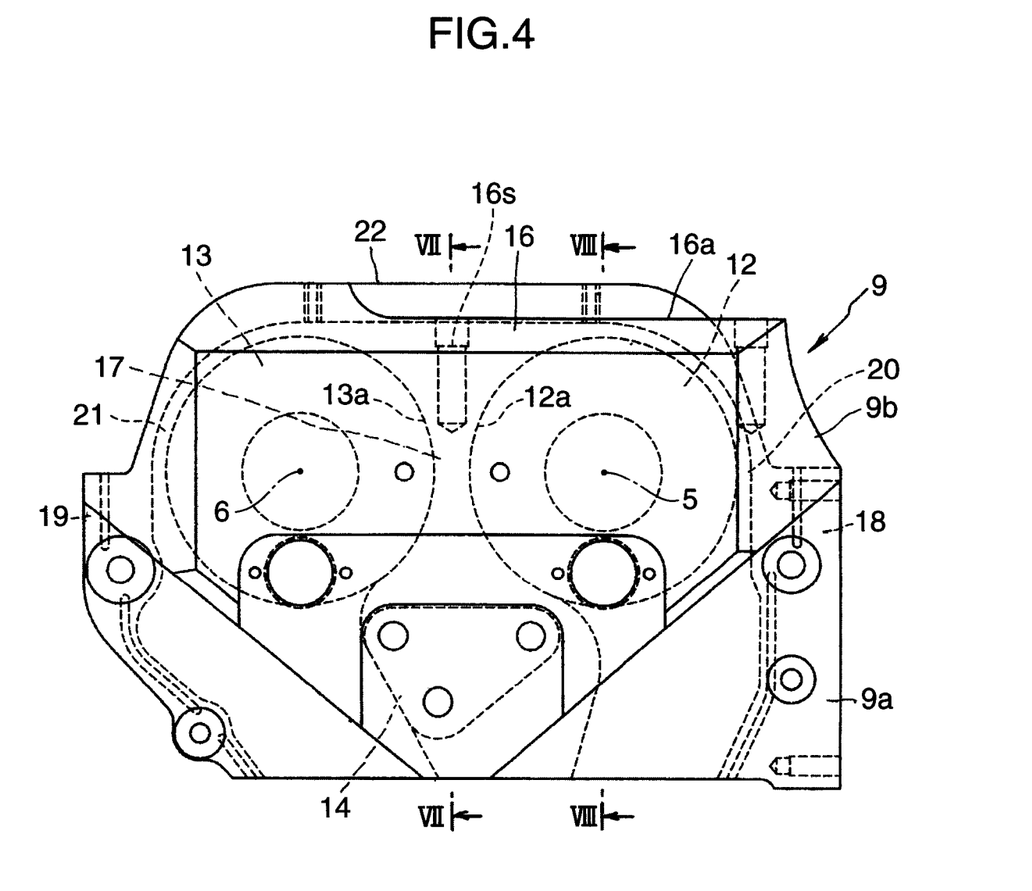
FIG. 4 is a front view showing a timing cover in the engine front structure according to the embodiment of the present invention.
Figure 5:
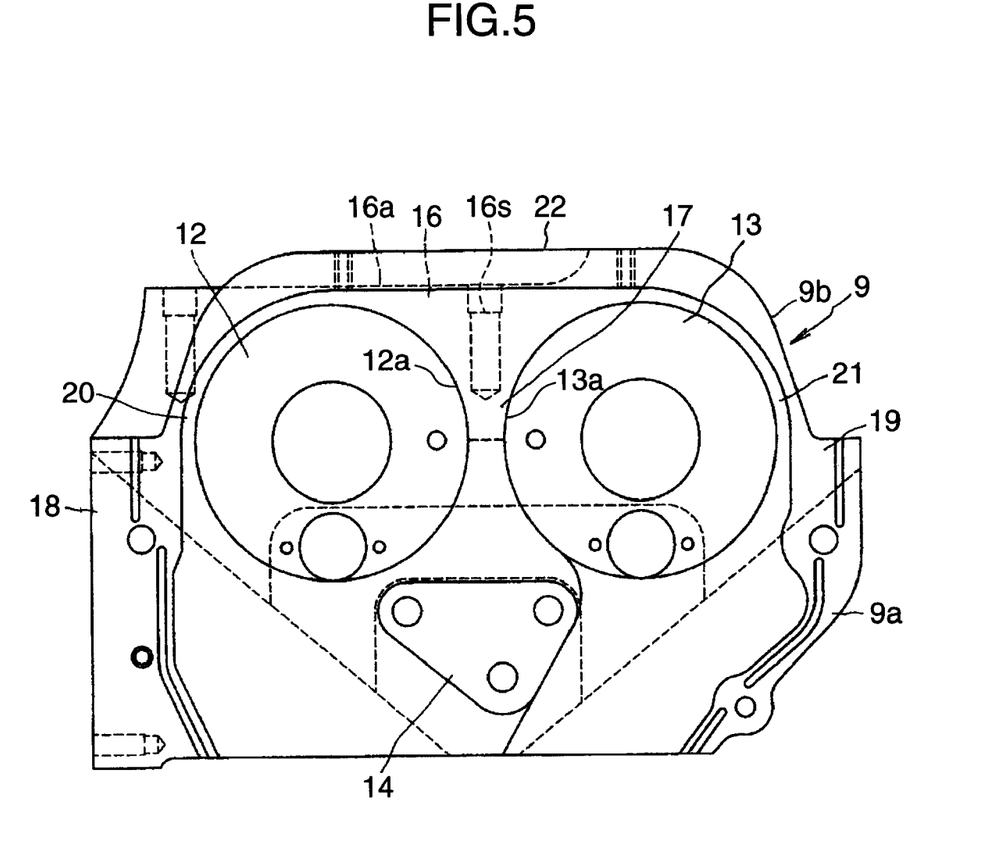
FIG. 5 is a back view of the timing cover in FIG. 4.
Figure 6:
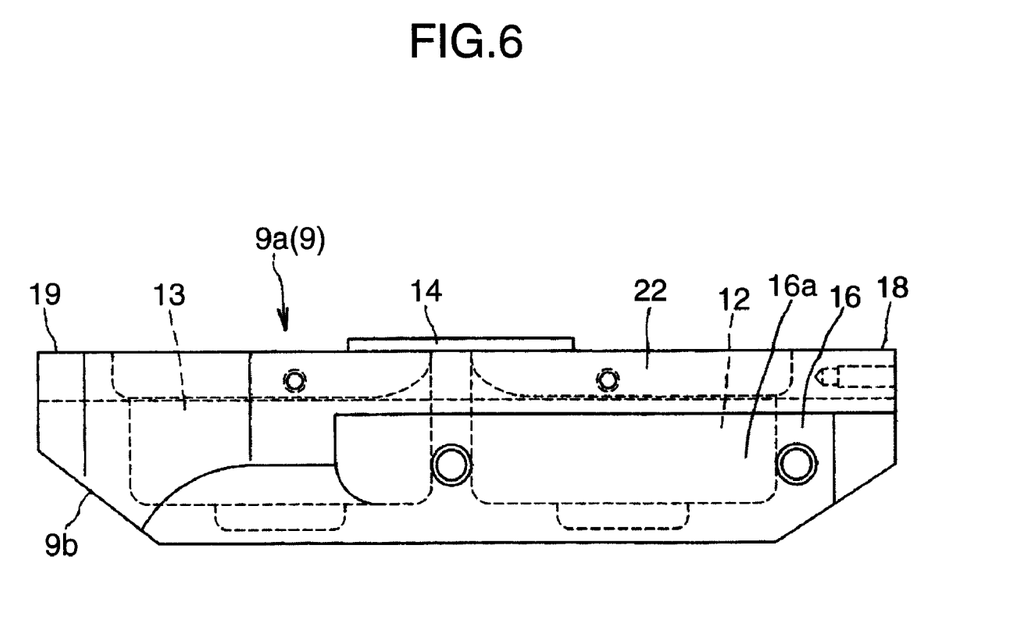
FIG. 6 is a top plan view of the timing cover in FIG. 4.
Figure 7:
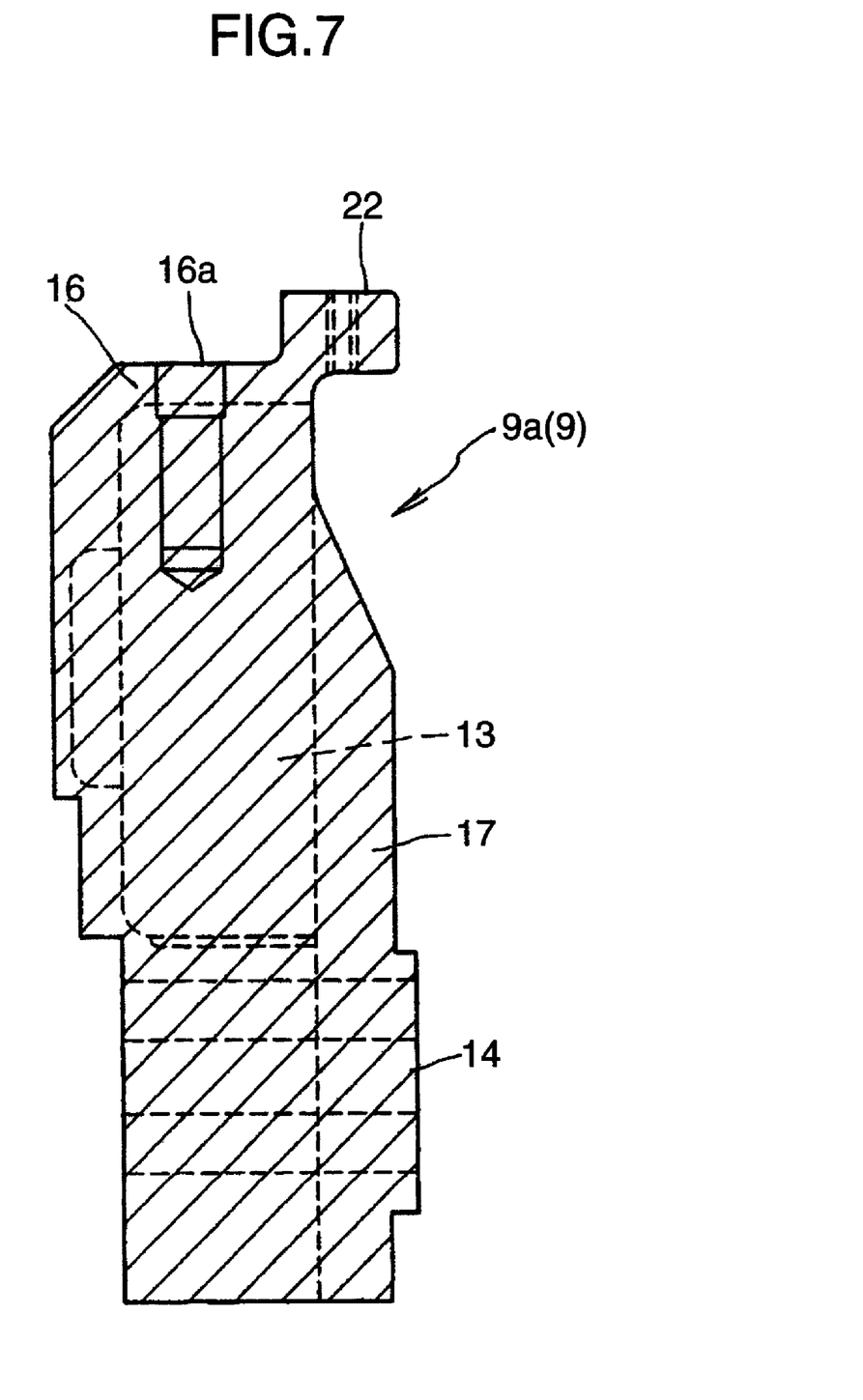
FIG. 7 is a sectional view taken along the line VII-VII in FIG. 4.
Figure 8:
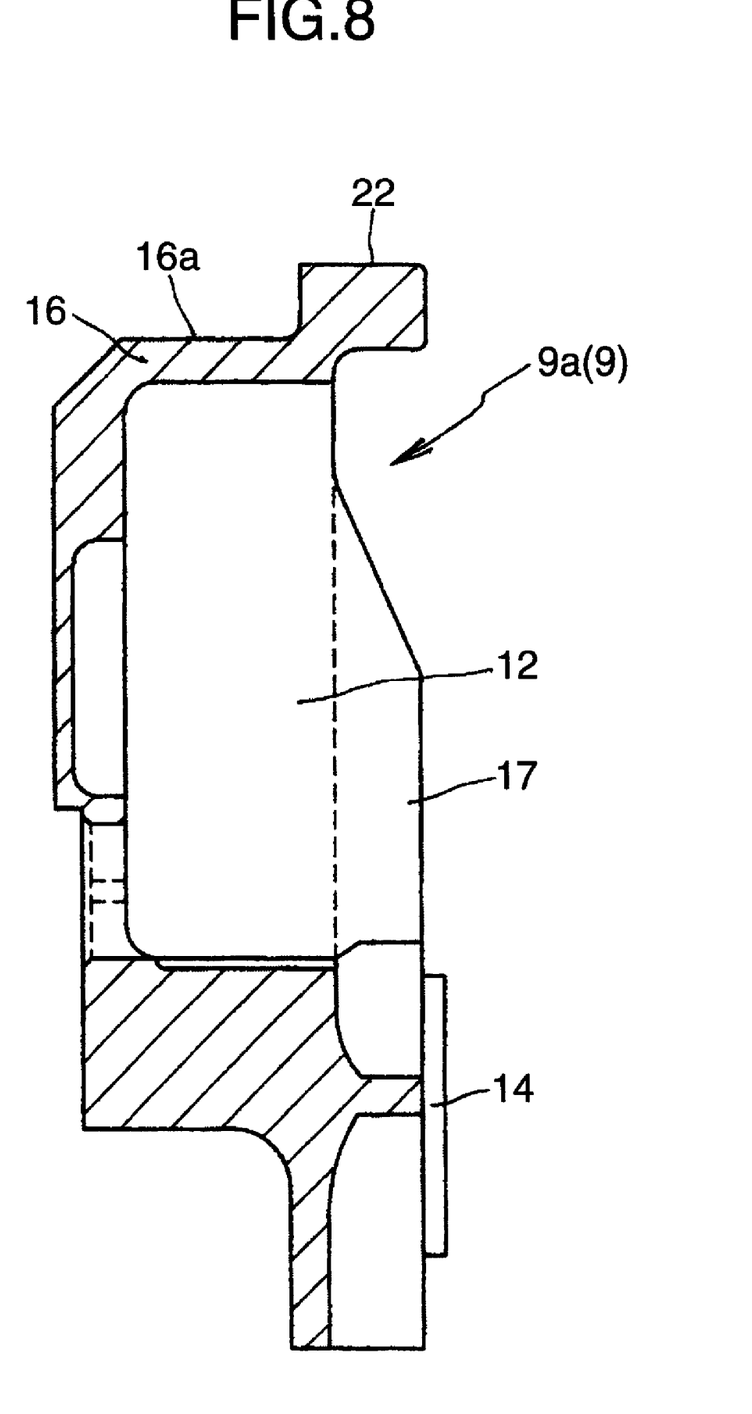
FIG. 8 is a sectional view taken along the line VIII-VIII in FIG. 4.

As shown in FIGS. 4 and 5, the upper extension portion 9b has an inner surface, i.e., a surface on a rearward side of the engine, which is formed with two depressions 12 and 13 each formed to have an approximately circular shape and receive therein a corresponding one of the variable camshaft timing mechanisms 7 and 8 disposed at the respective front ends of the intake and exhaust camshafts 5 and 6. Further, as shown in FIGS. 6 to 8, the cover body 9a has a fastening seat 14 in an approximately central region thereof. The fastening seat 14 is increased in wall thickness to have a relatively high stiffness, and fastened to the engine body B (cylinder head 4) with a bolt. The upper extension portion 9b has an engine-mounting-bracket receiving seat 16 extending from a central region to a right (in front view) end of a top surface thereof. The engine-mounting-bracket receiving seat 16 is increased in wall thickness to have a relatively high stiffness, and formed to have a seat surface 16a allowing an engine mounting bracket 15 to be fastened thereto at two positions with bolts. The upper extension portion 9b also has a connection portion 17 formed on a central region of the inner surface thereof in a width direction of the engine. The connection portion 17 is increased in wall thickness to have a relatively high stiffness. The upper extension portion 9b is formed to extend along the depressions 12 and 13 and connect between the fastening seat 14 and the engine-mounting-bracket receiving seat 16.

Referring to FIGS. 4 and 5, the timing cover 9 has two flanges 18 and 19 provided along respective side edges of the timing cover 9 which are opposed to each other in the width direction of the engine, and fastened to the cylinder head 4 with bolts. The flange 18 (on the right side in front view) is formed to have a wall thickness greater than that of the flange 19 (on the left side in front view), i.e., have a stiffness greater than that of the flange 19, and connect with the engine-mounting-bracket receiving seat 16 through the upper extension portion 9b. Each of the depressions 12 and 13 receiving therein the respective variable camshaft timing mechanisms 7 and 8 has two side walls 20 and 21 located in opposed relation to each other in the width direction of the engine. Each of the side walls 20 and 21 is increased in wall thickness to have a relatively high stiffness, and formed to connect with the engine-mounting-bracket receiving seat 16.

Referring to FIGS. 4 to 8, the top surface of the upper extension portion 9b is formed with a sealing edge 22 on the rearward side of the engine relative to the engine-mounting-bracket receiving seat 16 of the upper extension portion 9b, to allow a front edge 11a of the cylinder head cover 11 to be attached thereto along the engine-mounting-bracket receiving seat 16.

As shown in FIGS. 4 and 5, the seat surface 16a of the engine-mounting-bracket receiving seat 16 is formed substantially flat. The connection portion 17 continuously extends from the top of the fastening seat 14 and extends continuously to the engine-mounting-bracket receiving seat 16. The engine-mounting-bracket receiving seat 16 and the connection portion 17 share the common side surfaces that are right & left circular shaped inner side surfaces 12a, 13a of the right and left depressions 12, 13 which receive therein said variable camshaft mechanism 7, 8. Across sectional area of the side surfaces 12a, 13a taken along a horizontal line is substantially a filled rectangle from the lowermost of the depressions 12, 13 to the topmost of the depressions 12, 13, except a fastening hole 16s.

With the above structure and the cross sectional area, the stiffness of the connection portion 17 and the stiffness of the engine-mounting-bracket receiving seat 16 are made much higher than those corresponding elements of the timing cover with the structure where only a circumferential rib (or ribs) with a certain thickness is formed to surround the variable camshaft timing mechanisms 7, 8.

Figure 9:
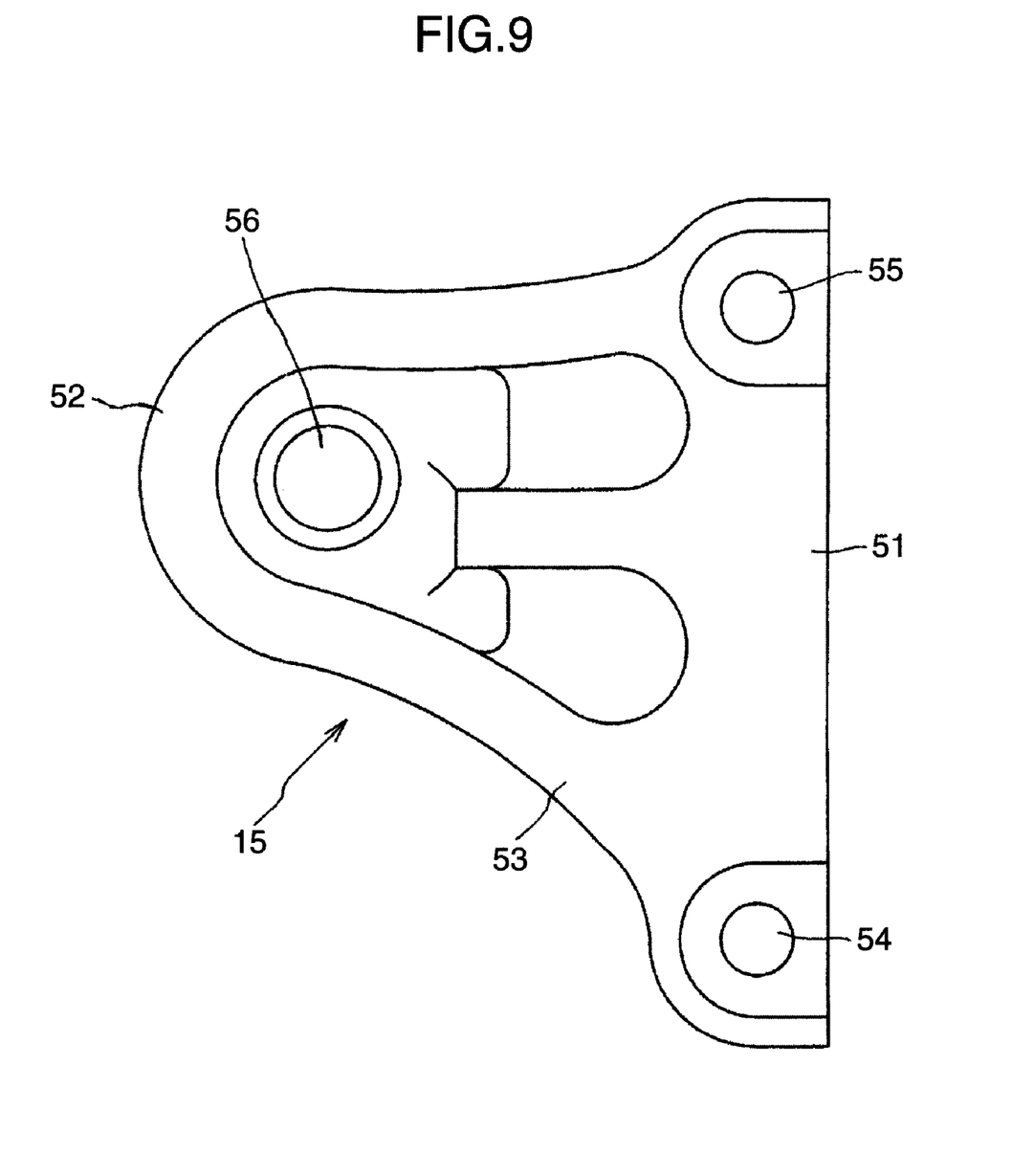
FIG. 9 is a top plan view showing an engine mounting bracket in the engine front structure according to the embodiment of the present invention.
Figure 10:
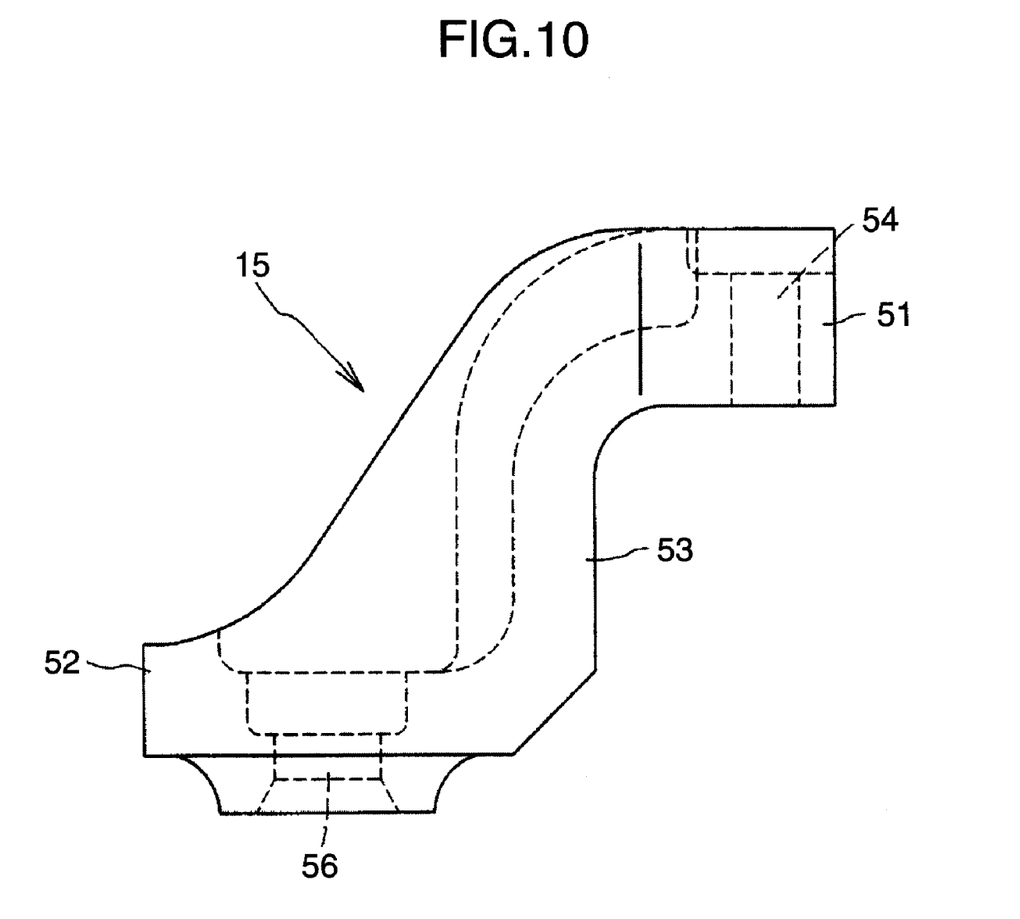
FIG. 10 is a side view of the engine mounting bracket in FIG. 9.

Referring to FIGS. 9 and 10, the mounting bracket 15 has an upper fastening surface portion 51 which is fastened to the seat surface 16a of the timing cover 9 with a bolt, a lower fastening surface portion 52 which is fastened to the engine mount 2 with a bolt, and a connection portion 53 extending upward from the lower fastening surface portion 52 to the upper fastening surface portion 51. The upper fastening surface portion 51 is formed with two bolt holes 54 and 55 for bolting, and the lower fastening surface portion 52 is formed with one bolt hole 56 having a diameter greater than that of each of the bolt holes 54 and 55.

Figure 11:
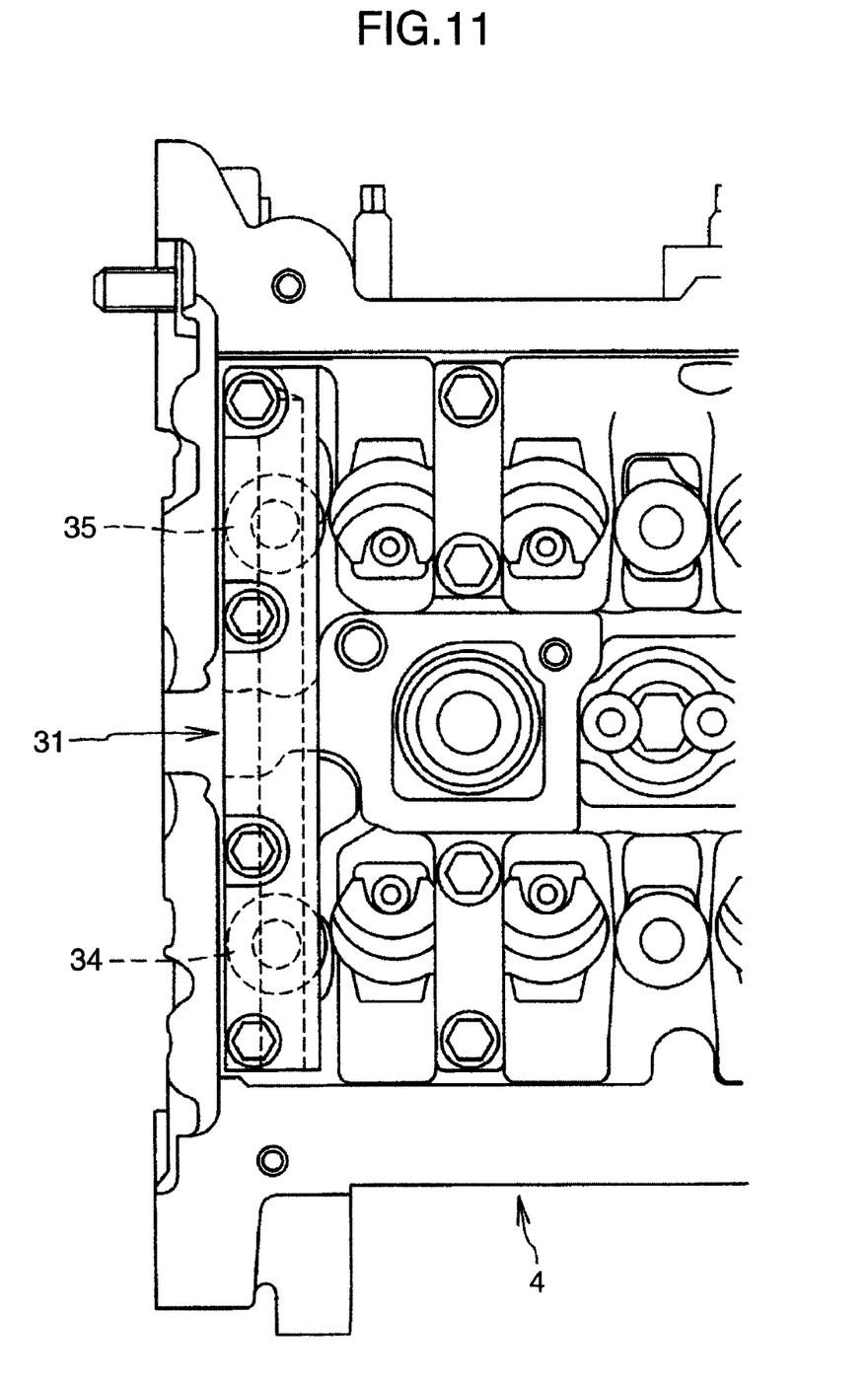
FIG. 11 is a top plan view showing a front of a cylinder head in the engine front structure according to the embodiment of the present invention.
Figure 12:
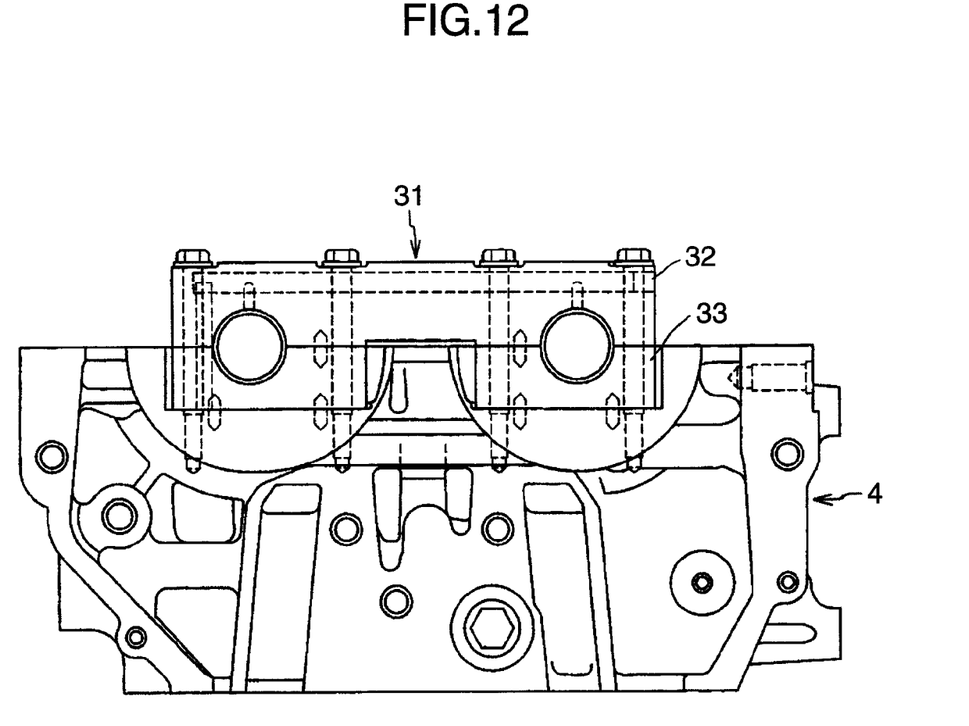
FIG. 12 is a front view showing the cylinder head in FIG. 11.

Referring to FIGS. 11 and 12, the engine includes a frontmost camshaft bearing portion 31 which supports the camshafts 5 and 6 at a frontmost position of the cylinder head 4. The frontmost camshaft bearing portion 31 is in the form of upper and lower bearing members 32 and 33 respectively separatable from the cylinder head 4. Each of the upper and lower bearing members 32 and 33 is designed to rotatably support respective halves of the front ends of the intake and exhaust camshafts 5 and 6. The cylinder head 4 is formed with two fastening portions (bolt bosses) 34 and 35 at respective positions downwardly overlapping the frontmost camshaft bearing portion 31 to fasten the cylinder head 4 to the cylinder block 3 with bolts therethrough.

In FIG. 1, the codes S1 and S2 indicate a sealing rubber which seals between the timing cover 9 and the cylinder head cover 11, and a sealing rubber which seals between the cylinder head 4 and the cylinder head cover 11, respectively. These sealing rubbers S1 and S2 are integrally formed as a single component.

The present invention may be applied to various types of engines, for example, an engine equipped with a hydraulically-controlled type variable camshaft timing mechanism for an exhaust camshaft.

In sum, a first aspect of the present invention relates to an engine front structure where an engine includes an engine body having a cylinder block and a cylinder head disposed at a top of the cylinder block; intake and exhaust camshafts which are disposed in an upper portion of the cylinder head and in parallel relation to each other; and a variable camshaft timing mechanism provided at one end of at least the intake camshaft in the camshafts to controllably change a rotational phase of corresponding camshaft. The variable camshaft timing mechanism is located on the side of a front of the engine where a camshaft driving force transmission mechanism is arranged. The engine is also provided with a timing cover. The engine front structure is provided with: a cover body of the timing cover which covers the camshaft driving force transmission mechanism at a position opposed to a front surface of the cylinder head; an upper extension portion of the timing cover which extends upwardly from an upper portion of the cover body and has an inner surface formed with a depression receiving therein the variable camshaft timing mechanism; a fastening seat on the cover body with a relatively high stiffness which is located beneath of the upper extension portion and centrally in a width direction of the engine and is fastened to the engine body; an engine-mounting-bracket receiving seat which is formed on a top surface of the upper extension portion to have a relatively high stiffness and attached to an engine mounting bracket; and a connection portion which is provided on a central region of the inner surface of the upper extension portion in the width direction of the engine to extend along the depression and connect between the fastening seat and the engine-mounting-bracket receiving seat with a relatively high stiffness.

In a preferred embodiment, the timing cover has two flanges which are provided along respective side edges of the timing cover to be attached to the cylinder head and are integrally connected with the engine-mounting-bracket receiving seat through the upper extension portion. In this embodiment, one of the flanges is formed to have a stiffness greater than that of the other flange.

In another preferred embodiment, the variable camshaft timing mechanism is a solenoid-controlled type variable camshaft timing mechanism incorporating a solenoid actuator, and the upper extension portion of the timing cover has an overlapping region with the variable camshaft timing mechanism. In this embodiment, the overlapping region is formed to be concaved forwardly relative to the front of the engine so as to define the depression receiving therein the variable camshaft timing mechanism in such a manner that the depression has two side walls located in opposed relation to each other in the width direction of the engine and each formed to have a relatively high stiffness and connect with the engine-mounting-bracket receiving seat.

In another preferred embodiment, the engine is a transverse engine designed to be mounted and supported relative to a front frame of a vehicle body in such a manner that a crankshaft of the engine is oriented in a lateral direction of the vehicle body.

In another preferred embodiment, there is included a frontmost camshaft bearing portion which supports the camshafts at a frontmost position of the cylinder head. The frontmost camshaft bearing portion is in the form of upper and lower bearing members respectively separatable from the cylinder head. In this embodiment, a fastening portion is formed with the cylinder head at a position beneath of the frontmost camshaft bearing portion to fasten the cylinder head to the cylinder block with a bolt therethrough.

In another preferred embodiment, there is further included a cylinder head cover disposed above the cylinder head, and the top surface of the upper extension portion is formed with a sealing edge on a rearward side of the engine relative to the engine-mounting-bracket receiving seat of the upper extension portion, to allow a front edge of the cylinder head cover to be attached thereto along the engine-mounting-bracket receiving seat.

A second aspect of the present invention relates to an engine front structure where an engine which includes an engine body having a cylinder block and a cylinder head disposed at a top of the cylinder block; intake and exhaust camshafts which are disposed in an upper portion of the cylinder head and in parallel relation to each other; and a variable camshaft timing mechanism provided at one end of at least the intake camshaft in the camshafts to controllably change a rotational phase of corresponding camshaft. The variable camshaft timing mechanism is located on the side of a front of the engine where a camshaft driving force transmission mechanism is arranged. The engine is also provided with a timing cover. The engine front structure is provided with: a cover body of the timing cover which covers the camshaft driving force transmission mechanism at a position opposed to a front surface of the cylinder head; an upper extension portion of the timing cover which extends upwardly from an upper portion of the cover body and has an inner surface formed with a depression receiving therein the variable camshaft timing mechanism; a fastening seat on the cover body with a relatively high stiffness which is located beneath of the upper extension portion and centrally in a width direction of the engine and is fastened to the engine body; an engine-mounting-bracket receiving seat which is formed on a top surface of the upper extension portion to have a relatively high stiffness and attached to an engine mounting bracket; and a connection portion which is provided on a central region of the inner surface of the upper extension portion in the width direction of the engine to extend along the depression and connect between the fastening seat and the engine-mounting-bracket receiving seat with a relatively high stiffness. The timing cover has two flanges which are provided along respective side edges of the timing cover to be attached to the cylinder head and are integrally connected with the engine-mounting-bracket receiving seat through the upper extension portion. In this embodiment, one of the flanges is formed to have a stiffness greater than that of the other flange. One of the flanges is formed to have a stiffness greater than that of the other flange, and connect with the engine-mounting-bracket receiving seat through the upper extension portion. Further, the engine is a transverse engine designed to be mounted and supported relative to a front frame of a vehicle body in such a manner that a crankshaft of the engine is oriented in a lateral direction of the vehicle body.

A third aspect of the present invention relates to an engine front structure where an engine which includes an engine body having a cylinder block and a cylinder head disposed at a top of the cylinder block; intake and exhaust camshafts which are disposed in an upper portion of the cylinder head and in parallel relation to each other; and a variable camshaft timing mechanism provided at one end of at least the intake camshaft in the camshafts to controllably change a rotational phase of corresponding camshaft. The variable camshaft timing mechanism is located on the side of a front of the engine where a camshaft driving force transmission mechanism is arranged. The engine is also provided with a timing cover. The engine front structure is provided with: a cover body of the timing cover which covers the camshaft driving force transmission mechanism at a position opposed to a front surface of the cylinder head; an upper extension portion of the timing cover which extends upwardly from an upper portion of the cover body and has an inner surface formed with a depression receiving therein the variable camshaft timing mechanism; a fastening seat on the cover body with a relatively high stiffness which is located beneath of the upper extension portion and centrally in a width direction of the engine and is fastened to the engine body; an engine-mounting-bracket receiving seat which is formed on a top surface of the upper extension portion to have a relatively high stiffness and attached to an engine mounting bracket; and a connection portion which is provided on a central region of the inner surface of the upper extension portion in the width direction of the engine to extend along the depression and connect between the fastening seat and the engine-mounting-bracket receiving seat with a relatively high stiffness. The variable camshaft timing mechanism is a solenoid-controlled type variable camshaft timing mechanism incorporating a solenoid actuator. The upper extension portion of the timing cover has an overlapping region with the variable camshaft timing mechanism. The overlapping region is formed to be concaved forwardly relative to the front of the engine so as to define the depression receiving therein the variable camshaft timing mechanism in such a manner that the depression has two side walls located in opposed relation to each other in the width direction of the engine and each formed to have a relatively high stiffness and connect with the engine-mounting-bracket seat. Further, the engine is a transverse engine designed to be mounted and supported relative to a front frame of a vehicle body in such a manner that a crankshaft of the engine is oriented in a lateral direction of the vehicle body.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

This application is based on Japanese Patent Application Serial No. 2006-180779, filed in Japan Patent Office on Jun. 30, 2006, the contents of which are hereby incorporated by reference.

What is claimed is:

1. An engine front structure where an engine includes: an engine body having a cylinder block and a cylinder head disposed at a top of said cylinder block; intake and exhaust camshafts which are disposed in an upper portion of said cylinder head and in parallel relation to each other; a variable camshaft timing mechanism provided at one end of at least said intake camshaft in said camshafts to controllably change a rotational phase of corresponding camshaft wherein said variable camshaft timing mechanism is located on the side of a front of said engine where a camshaft driving force transmission mechanism is arranged; and a timing cover, said engine front structure comprising:
- a cover body of said timing cover which covers said camshaft driving force transmission mechanism at a position opposed to a front surface of said cylinder head;
- an upper extension portion of said timing cover which extends upwardly from an upper portion of said cover body and has an inner surface formed with a depression receiving therein said variable camshaft timing mechanism;
- a fastening seat being formed on said cover body with a relatively high stiffness which is located beneath of said upper extension portion and centrally in a width direction of said engine and is fastened to said engine body;
- an engine-mounting-bracket receiving seat which is formed on a top surface of said upper extension portion to have a relatively high stiffness and attached to an engine mounting bracket; and
- a connection portion which is provided on a central region of the inner surface of the upper extension portion in the width direction of said engine to extend along said depression and connect between said fastening seat and said engine-mounting-bracket receiving seat with a relatively high stiffness.

2. The engine front structure according to claim 1, wherein said timing cover has two flanges which are provided along respective side edges of said timing cover to be attached to said cylinder head and are integrally connected with said engine-mounting-bracket receiving seat through said upper extension portion, one of said flanges being formed to have a stiffness greater than that of the other flange.

3. The engine front structure according to claim 1, wherein said variable camshaft timing mechanism is a solenoid-controlled type variable camshaft timing mechanism incorporating a solenoid actuator, said upper extension portion of said timing cover has an overlapping region with said variable camshaft timing mechanism, and said overlapping region being formed to be concaved forwardly relative to the front of said engine so as to define said depression receiving therein said variable camshaft timing mechanism in such a manner that said depression has two side walls located in opposed relation to each other in the width direction of said engine and each formed to have a relatively high stiffness and connect with said engine-mounting-bracket receiving seat.

4. The engine front structure according to claim 1, wherein said engine is a transverse engine designed to be mounted and supported relative to a front frame of a vehicle body in such a manner that a crankshaft of said engine is oriented in a lateral direction of said vehicle body.

5. The engine front structure according to claim 1, further comprising a frontmost camshaft bearing portion which supports said camshafts at a frontmost position of said cylinder head, wherein said frontmost camshaft bearing portion is in the form of upper and lower bearing members respectively separatable from said cylinder head; and a fastening portion formed with said cylinder head at a position beneath of said frontmost camshaft bearing portion to fasten said cylinder head to said cylinder block with a bolt therethrough.

6. The engine front structure according to claim 1, wherein said engine further comprising a cylinder head cover disposed above said cylinder head, wherein said top surface of said upper extension portion is formed with a sealing edge on a rearward side of said engine relative to said engine-mounting-bracket receiving seat of said upper extension portion, to allow a front edge of said cylinder head cover to be attached thereto along said engine-mounting-bracket receiving seat.

7. The engine front structure according to claim 1, wherein the top surface of said engine-mounting-bracket receiving seat 16 is formed substantially flat and said engine-mounting-bracket receiving seat 16 and said connection portion 17 are continuously formed in such a manner that they 16, 17 share the common side surface that is a circular shaped inner side surface of one of the depressions 12, 13 which receives therein said variable camshaft mechanism 7, 8.

8. An engine front structure where an engine includes: an engine body having a cylinder block and a cylinder head disposed at a top of said cylinder block; intake and exhaust camshafts which are disposed in an upper portion of said cylinder head and in parallel relation to each other; a variable camshaft timing mechanism provided at one end of at least said intake camshaft in said camshafts to controllably change a rotational phase of corresponding camshaft wherein said variable camshaft timing mechanism is located on the side of a front of said engine where a camshaft driving force transmission mechanism is arranged; and a timing cover, said engine front structure comprising:
- a cover body of said timing cover which covers said camshaft driving force transmission mechanism at a position opposed to a front surface of said cylinder head;
- an upper extension portion of said timing cover which extends upwardly from an upper portion of said cover body and has an inner surface formed with a depression receiving therein said variable camshaft timing mechanism;
- a fastening seat on said cover body with a relatively high stiffness which is located beneath of said upper extension portion and centrally in a width direction of said engine and is fastened to said engine body;
- an engine-mounting-bracket receiving seat which is formed on a top surface of said upper extension portion to have a relatively high stiffness and attached to an engine mounting bracket; and
- a connection portion which is provided on a central region of the inner surface of the upper extension portion in the width direction of said engine to extend along said depression and connect between said fastening seat and said engine-mounting-bracket receiving seat with a relatively high stiffness, wherein:
said timing cover has two flanges which are provided along respective side edges of said timing cover to be attached to said cylinder head and are integrally connected with said engine-mounting-bracket receiving seat through said upper extension portion, one of said flanges being formed to have a stiffness greater than that of the other flange; and
said engine is a transverse engine designed to be mounted and supported relative to a front frame of a vehicle body in such a manner that a crankshaft of said engine is oriented in a lateral direction of said vehicle body.

9. An engine front structure where an engine includes: an engine body having a cylinder block and a cylinder head disposed at a top of said cylinder block; intake and exhaust camshafts which are disposed in an upper portion of said cylinder head and in parallel relation to each other; a variable camshaft timing mechanism provided at one end of at least said intake camshaft in said camshafts to controllably change a rotational phase of corresponding camshaft wherein said variable camshaft timing mechanism is located on the side of a front of said engine where a camshaft driving force transmission mechanism is arranged; and a timing cover, said engine front structure comprising:

a cover body of said timing cover which covers said camshaft driving force transmission mechanism at a position opposed to a front surface of said cylinder head;

an upper extension portion of said timing cover which extends upwardly from an upper portion of said cover body and has an inner surface formed with a depression receiving therein said variable camshaft timing mechanism;

a fastening seat on said cover body with a relatively high stiffness which is located beneath of said upper extension portion and centrally in a width direction of said engine and is fastened to said engine body;

an engine-mounting-bracket receiving seat which is formed on a top surface of said upper extension portion to have a relatively high stiffness and attached to an engine mounting bracket; and a connection portion which is provided on a central region of the inner surface of the upper extension portion in the width direction of said engine to extend along said depression and connect between said fastening seat and said engine-mounting-bracket receiving seat with a relatively high stiffness, wherein:

said variable camshaft timing mechanism is a solenoid-controlled type variable camshaft timing mechanism incorporating a solenoid actuator, wherein said upper extension portion of said timing cover has an overlapping region with said variable camshaft timing mechanism, said overlapping region being formed to be concaved forwardly relative to the front of said engine so as to define said depression receiving therein said variable camshaft timing mechanism in such a manner that said depression has two side walls located in opposed relation to each other in the width direction of said engine and each formed to have a relatively high stiffness and connect with said engine-mounting-bracket receiving seat; and said engine is a transverse engine designed to be mounted and supported relative to a front frame of a vehicle body in such a manner that a crankshaft of said engine is oriented in a lateral direction of said vehicle body.

* * * * *